US012094486B2

(12) United States Patent
Berrian et al.

(10) Patent No.: US 12,094,486 B2
(45) **Date of Patent: *Sep. 17, 2024**

(54) AUDIO CONTENT RECOGNITION METHOD AND SYSTEM

(71) Applicant: Gracenote, Inc., Emeryville, CA (US)

(72) Inventors: Alexander Berrian, Emeryville, CA (US); Todd J. Hodges, Oakland, CA (US); Robert Coover, Orinda, CA (US); Matthew James Wilkinson, Emeryville, CA (US); Zafar Rafii, Berkeley, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,618

(22) Filed: Jun. 15, 2023

(65) Prior Publication Data

US 2023/0326479 A1 Oct. 12, 2023

Related U.S. Application Data

(63) Continuation of application No. 17/315,820, filed on May 10, 2021, now Pat. No. 11,727,953.

(60) Provisional application No. 63/133,047, filed on Dec. 31, 2020.

(51) Int. Cl.

| | |
|---|---|
| ***G10L 19/018*** | (2013.01) |
| ***G10L 25/27*** | (2013.01) |
| ***G10L 25/54*** | (2013.01) |
| ***G10L 25/72*** | (2013.01) |
| *G10L 19/028* | (2013.01) |
| *G10L 25/18* | (2013.01) |

(52) U.S. Cl.

CPC ............ *G10L 25/54* (2013.01); *G10L 19/018* (2013.01); *G10L 25/27* (2013.01); *G10L 25/72* (2013.01); *G10L 19/028* (2013.01); *G10L 25/18* (2013.01)

(58) Field of Classification Search

CPC ...... G10L 19/018; G10L 25/18; G10L 19/028
See application file for complete search history.

(56) References Cited

U.S. PATENT DOCUMENTS

| | | | | |
|---|---|---|---|---|
| 9,275,427 | B1 * | 3/2016 | Sharifi | G06V 20/46 |
| 10,236,006 | B1 * | 3/2019 | Gurijala | G10L 19/02 |
| 10,360,905 | B1 * | 7/2019 | Pereira | G06V 30/18086 |
| 2009/0326942 | A1 * | 12/2009 | Fulop | G10L 17/02 704/E17.001 |
| 2013/0080159 | A1 * | 3/2013 | Sharifi | H04L 65/611 704/E15.001 |

* cited by examiner

*Primary Examiner* — Thomas H Maung
(74) *Attorney, Agent, or Firm* — McDonnell Boehnen Hulbert & Berghoff LLP

(57) ABSTRACT

A method implemented by a computing system comprises generating, by the computing system, a fingerprint comprising a plurality of bin samples associated with audio content. Each bin sample is specified within a frame of the fingerprint and is associated with one of a plurality of non-overlapping frequency ranges and a value indicative of a magnitude of energy associated with a corresponding frequency range. The computing system removes, from the fingerprint, a plurality of bin samples associated with a frequency sweep in the audio content.

20 Claims, 10 Drawing Sheets

CONTENT MATCHING RECORDS
600

| Content ID | Content Information | Fingerprint Information |
| --- | --- | --- |
| CID1 | Song X, Artist Y, Album Z | FP_1, FP_2, ..., FP_N |
| CID2 | Song A, Artist B, Album C | FP_1, FP_2, ..., FP_N |
| . . . | . . . | . . . |
| $CID_M$ | Song W, Artist U, Album V | FP_1, FP_2, ..., FP_N |

*FIG. 6*

AUDIO CONTENT RECOGNITION METHOD AND SYSTEM

RELATED APPLICATIONS

This application is a continuation of U.S. application Ser. No. 17/315,820, filed May 10, 2021, which claims the benefit of priority under 35 U.S.C. § 119(e) of U.S. Provisional Application No. 63/133,047, filed Dec. 31, 2020, the content of which is incorporated herein by reference in its entirety.

BACKGROUND

Field

This application generally relates to audio content recognition. In particular, this application describes an audio content recognition method and system for performing audio content recognition.

Description of Related Art

Audio information (e.g., sounds, speech, music, etc.) can be represented as digital data (e.g., electronic, optical, etc.). Captured audio (e.g., via a microphone) can be digitized, stored electronically, processed, and/or cataloged. One way of cataloging audio information is by generating an audio fingerprint. Audio fingerprints are digital summaries of audio information created by sampling a portion of the audio signal. Audio fingerprints have historically been used to identify audio and/or verify audio authenticity.

SUMMARY

In a first aspect, a method implemented by a computing system comprises generating, by the computing system, a fingerprint comprising a plurality of bin samples associated with audio content. Each bin sample is specified within a frame of the fingerprint and is associated with one of a plurality of non-overlapping frequency ranges and a value indicative of a magnitude of energy associated with a corresponding frequency range. The computing system removes, from the fingerprint, a plurality of bin samples associated with a frequency sweep in the audio content.

In a second aspect, a computing system includes a memory and a processor. The memory stores instruction code. The processor is in communication with the memory. The instruction code is executable by the processor to cause the computing system to perform operations that include generating, by the computing system, a fingerprint comprising a plurality of bin samples associated with audio content. Each bin sample is specified within a frame of the fingerprint and is associated with one of a plurality of non-overlapping frequency ranges and a value indicative of a magnitude of energy associated with a corresponding frequency range. The computing system removes, from the fingerprint, a plurality of bin samples associated with a frequency sweep in the audio content.

In a third aspect, a non-transitory computer-readable medium having stored thereon instruction code is provided. When the instruction code is executed by a processor, the processor performs operations that include generating, by the processor, a fingerprint comprising a plurality of bin samples associated with audio content. Each bin sample is specified within a frame of the fingerprint and is associated with one of a plurality of non-overlapping frequency ranges and a value indicative of a magnitude of energy associated with a corresponding frequency range. The processor removes, from the fingerprint, a plurality of bin samples associated with a frequency sweep in the audio content.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 6 illustrates content matching records stored in a database of the CRS, in accordance with an example.

DETAILED DESCRIPTION

Figure 1:
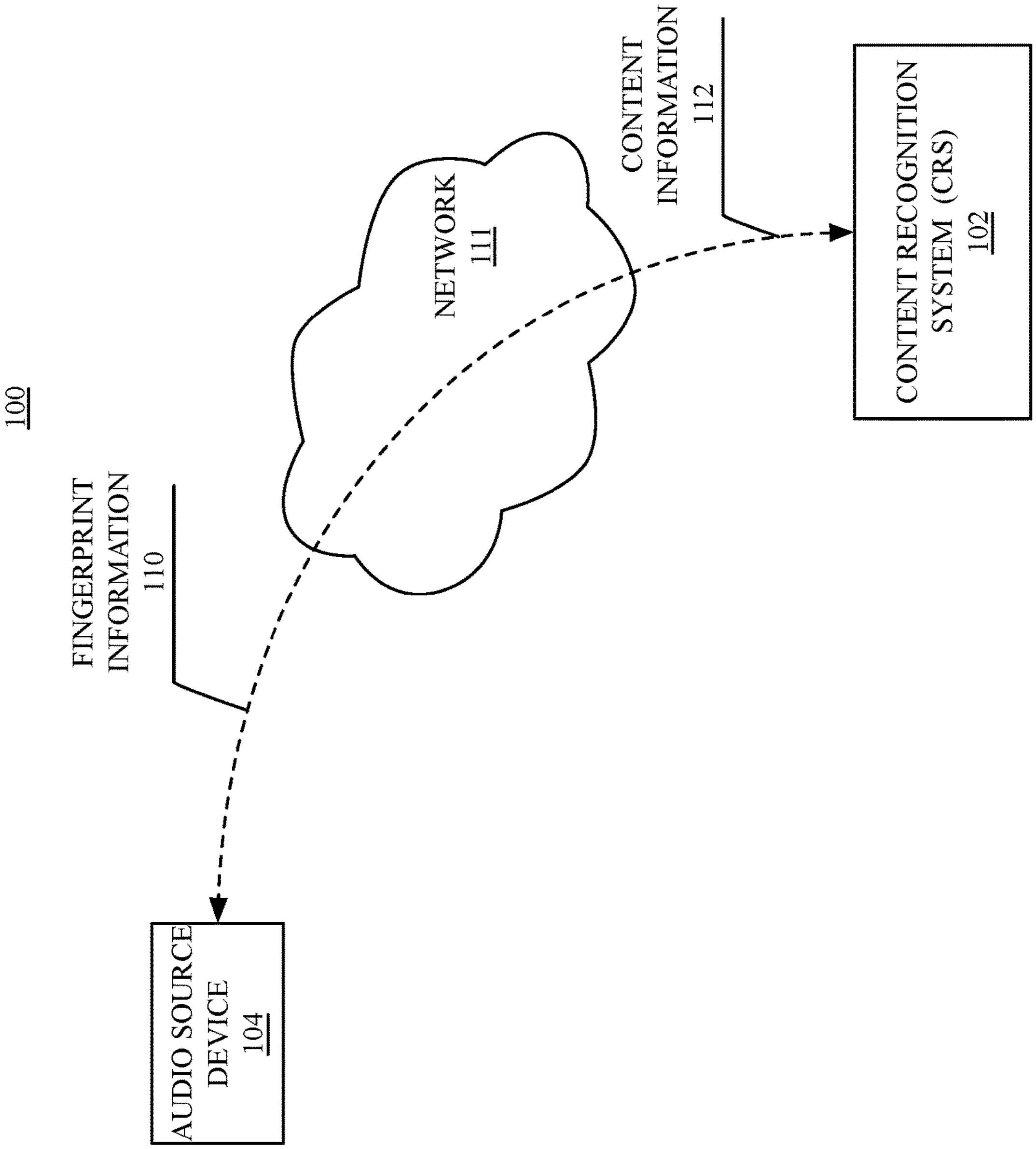
FIG. 1 illustrates an environment that includes various systems/devices that facilitate performing audio content recognition, in accordance with an example.

Implementations of this disclosure provide technological improvements that are particular to computer technology, such as those related to reducing the amount of time necessary to determine the best result to select and communicate in response to a computer-generated query. In this regard, a computing system is disclosed herein and is configured to generate a fingerprint associated with audio content. The computing system is configured to remove bin samples in the fingerprint associated with frequency sweeps. Removal of these bin samples improves the ability of a content matching recognition system to match the fingerprint to content information associated with the audio content. This, in turn, reduces processing and delay times required to match content.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

Fingerprint or signature-based media monitoring techniques generally utilize one or more inherent characteristics of the monitored media during a monitoring time interval to generate a substantially unique proxy for the media. Such a proxy is referred to as a signature or fingerprint and can take any form (e.g., a series of digital values, a waveform, etc.) representative of any aspect(s) of the media signal(s) (e.g., the audio and/or video signals forming the media presentation being monitored). A signature can be a series of signatures collected in series over a time interval. The term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature.

When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes can then be associated with the monitored media whose monitored signature matched the reference signature.

One issue that can make it difficult to match content occurs when attempting to match content that includes frequency sweeps, such as the sound a car engine may make as the car accelerates or that is sometimes present in modern dance music. Frequency sweeps can tend to be overemphasized when generating a fingerprint or signature for particular content. This can lead to false-positive matches. This issue and others are ameliorated by various examples of systems and methods described below.

FIG. 1 illustrates an example of an environment 100 that includes various systems/devices that facilitate performing audio content recognition. Example systems/devices of the environment 100 include an audio source device 104 and a content recognition system (CRS) 102. As described in further detail below, the audio source device 104 is configured to communicate fingerprint information 110 to the CRS 102. In response to receiving this information, the CRS 102 is configured to determine content information 112 associated with the fingerprint information (e.g., name of song, artist singing the song, album, etc.) and, in some examples, communicate the content information 112 to the audio source device 104. In an example, the audio source device 104 and CRS 102 communicate information to one another via a communication network 111, such as a cellular communication network, a WiFi network, etc.

Figure 2:
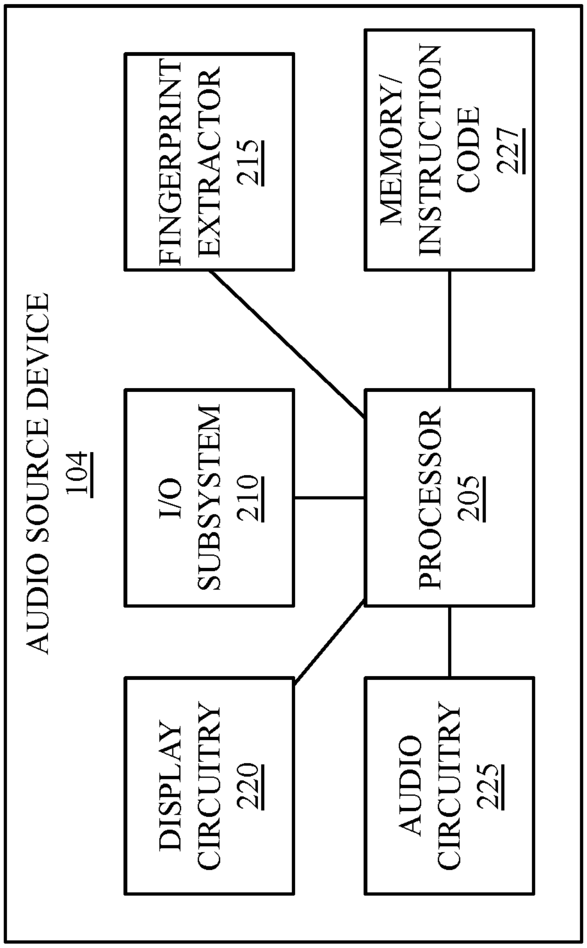
FIG. 2 illustrates an audio source device, in accordance with an example.

FIG. 2 illustrates an example of an audio source device 104. The audio source device 104 corresponds to an audio and/or video presentation device. An example of the audio source device 104 corresponds to a wearable device, such as a mobile device (e.g., mobile phone, watch, etc.). Another example of the audio source device 104 corresponds to or is in communication with a home television, stereo, etc. An example of the audio source device 104 includes a memory 227 and a processor 205. Another example of the audio source device 104 also includes an input/output (I/O) subsystem 210, display circuitry 220, audio circuitry 225, and a fingerprint extractor 215.

An example of the processor 205 is in communication with the memory 227. The processor 205 is configured to execute instruction code stored in the memory 227. The instruction code facilitates performing, by the audio source device 104, various operations that are described below. In this regard, the instruction code can cause the processor 205 to control and coordinate various activities performed by the different subsystems of the audio source device 104. An example of the processor 205 corresponds to a stand-alone computer system such as an Intel®, AMD®, or PowerPC® based computer system or a different computer system and can include application-specific computer systems. An example of the computer system includes an operating system, such as Linux, Unix®, or a different operating system.

An example of the I/O subsystem 210 includes one or more input/output interfaces configured to facilitate communications with other systems of the audio source device 104 and/or entities outside of the audio source device 104. For instance, an example of the I/O subsystem 210 includes wireless communication circuitry configured to facilitate communicating information to and from the CRS 102. An example of the wireless communication circuitry includes cellular telephone communication circuitry configured to communicate information over a cellular telephone network such as a 3G, 4G, and/or 5G network. Other examples of the wireless communication circuitry facilitate communication of information via an 802.11 based network, Bluetooth®, Zigbee®, near field communication technology, or a different wireless network.

An example of the display circuitry 220 includes a liquid crystal display (LCD), light-emitting diode display (LED) display, etc. An example of the display circuitry 220 includes a transparent capacitive touch layer that facilitates receiving user commands. An example of the display circuitry 220 is configured to depict a graphical user interface (GUI). An example of the GUI is configured to generate an overlay over some or all of the content being rendered by the display. An example of the overlay facilitates displaying static text/images and/or video content.

An example of the audio circuitry 225 includes one or more digital-to-analog converters (DAC), analog-to-digital converters (ADC), amplifiers, speakers, microphones, etc. An example of the audio circuitry 225 is configured to receive multiple streams of digital audio content (e.g., left channel, right channel) and to route these streams to corresponding DACs, amplifiers, and speakers. An example of the audio circuitry 225 is configured to mix audio content from two or more streams together and to route the combined streams to a single DAC, amplifier, and speaker. An example of the audio circuitry 225 is configured to receive multiple analog audio signals via the microphone or another analog audio input and to route these digitized audio samples to other subsystems in communication with the audio circuitry 225.

An example of the fingerprint extractor 215 is configured to generate fingerprints associated with the digitized audio samples generated by the audio circuitry 225. In an example, a time-domain audio signal is transformed via a Discrete Fourier Transform (DFT) algorithm into a group of bin samples (305, FIG. 3). An example of the DFT algorithm utilizes a fast Fourier transform (FFT) algorithm in its processing. An example of the DFT algorithm outputs a frame of bin values every 64 ms that correspond to energy magnitude levels associated with different frequencies present in the audio signal. For example, in an audio signal having a 20 kHz bandwidth, when linearly distributed, the first bin represents the energy magnitude level associated with frequencies between 0 Hz or DC to about 10 Hz, the second bin represents the energy magnitude level associated with the next 10 Hz, and so on. Thus, in this example, a frame of 2048 bin samples 305 is generated every 64 ms. In an example, the fingerprint extractor 215 is configured to select and aggregate a subset of the bin samples 305 within each frame that are the most relevant (e.g., the 20 bin samples 305 within each frame having the highest energy magnitude level) during each 64 ms cycle for about 6 seconds and to store the aggregated bin samples 305 as a single fingerprint.

Figure 3:
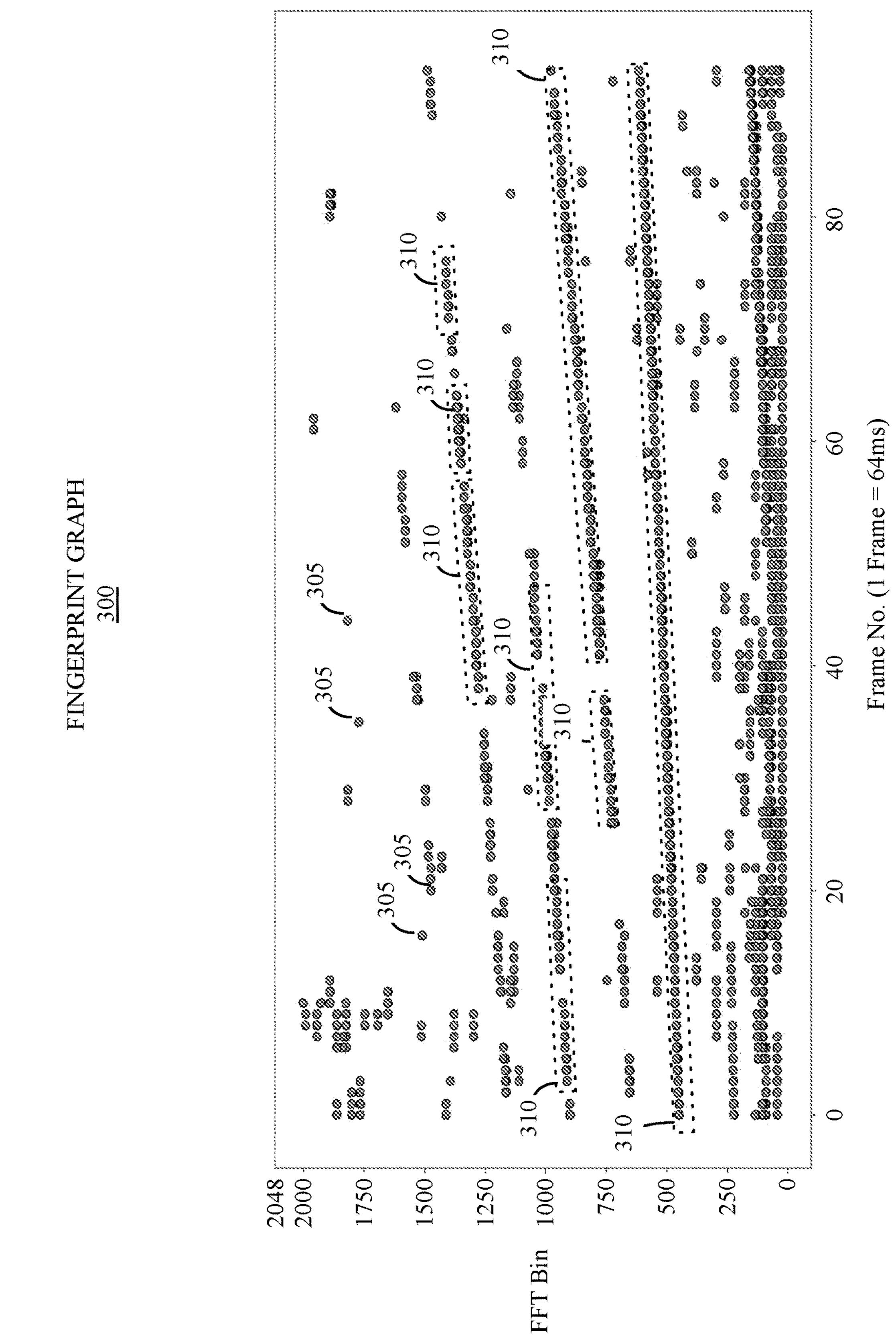
FIG. 3 illustrates a fingerprint graph associated with a fingerprint generated by a fingerprint extractor of the audio source device, in accordance with an example.

FIG. 3 illustrates a fingerprint graph 300 associated with an example of a fingerprint generated by the fingerprint extractor 215. The Y-axis corresponds to the bin number where the lowest order bin (i.e., bin 0) corresponds to the lowest frequencies, and DC, and the highest order bin (i.e., bin 2048) corresponds to the highest frequencies. The X-axis corresponds to the frame number. As shown, the fingerprint includes a plurality of bin samples 305. Each bin sample 305 is associated with a particular frame or timestamp at which the bin sample 305 was taken and a group of frequencies or bin. Each bin sample 305 specifies a value indicative of the energy magnitude level associated with the group of frequencies or bin. A sloped group of bin samples 310 corresponds to a frequency sweep in the audio content. That is, these bin samples 305 are associated with a gradually rising pitch or dropping pitch, such as the sound a car engine may make as the car accelerates or decelerates.

An example of the fingerprint extractor 215 is configured to remove, from the fingerprint, a plurality of bin samples 305 associated with a frequency sweep in the audio content. In one example, the fingerprint extractor 215 applies a Hough transform to identify groups of bin samples 305 that, when graphed according to frame number and bin number (or timestamp and frequency), define a substantially straight sloped line (i.e., correspond to a sloped group of bin samples 310).

The linear Hough transform represents a target line in the plot as a function of the distance, r, of a line that extends perpendicularly from the target line to the origin of the graph, and the angle, θ, the line makes with the x-axis of the graph. The linear Hough transform utilizes a two-dimensional accumulator array to detect the existence of a line described by these two parameters. Each element of the accumulator array is associated with a particular combination of (r, θ) and corresponds to a bin for accumulating a value. For each bin sample 305 at a particular location on the x-y axis (i.e., frame number-bin number axis of the graph), the Hough transform determines if there is enough evidence of a straight line between that bin sample 305 and neighboring bin samples 305. If so, the Hough transform calculates the parameters (r, θ) of that line and then increments the value of the corresponding bin of the accumulator. This process is repeated for all the bin samples 305. By finding the accumulator bins with the highest values, the most likely lines can be determined. The lines having a slope between an upper and lower threshold (e.g., between −20° and −5° or between 5° and 20°) are then correlated with the bin samples 305 in the fingerprint graph 300. Bin samples 305 that are highly correlated with these lines (e.g., that fall on the lines) are removed.

FIGS. 4A-4D illustrate an example of a fingerprint portion 400 before and after removal of bin samples 305. The fingerprint portion 400 in FIG. 4A includes a sloped group of bin samples 310. These bin samples are detected via the technique described above and removed, as illustrated in FIG. 4B.

Figure 4B:
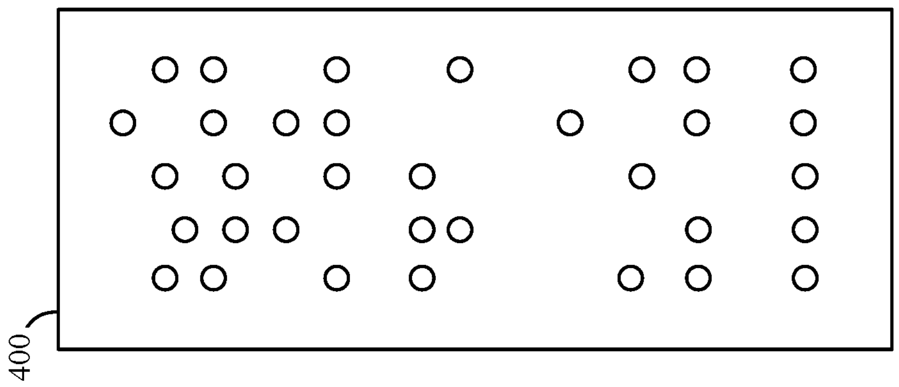
FIG. 4B illustrates the fingerprint portion after removal of bin samples, in accordance with an example.
Figure 4A:
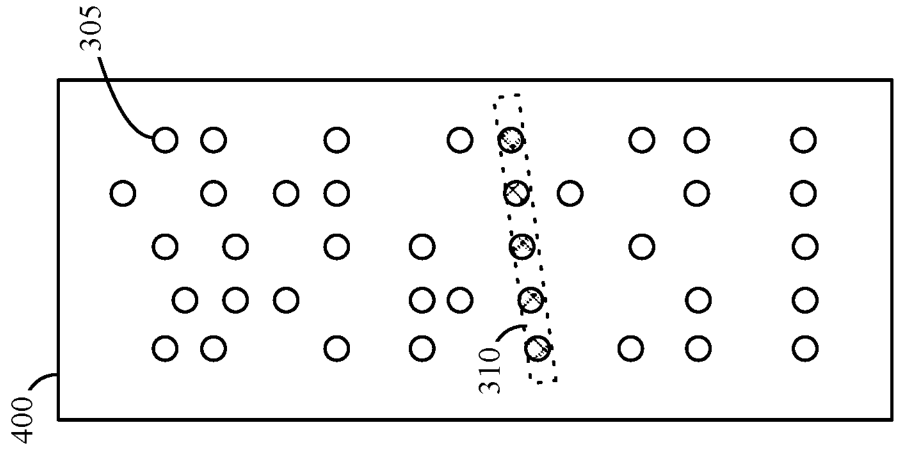
FIG. 4A illustrates a fingerprint portion before removal of bin samples, in accordance with an example.
Figure 4D:
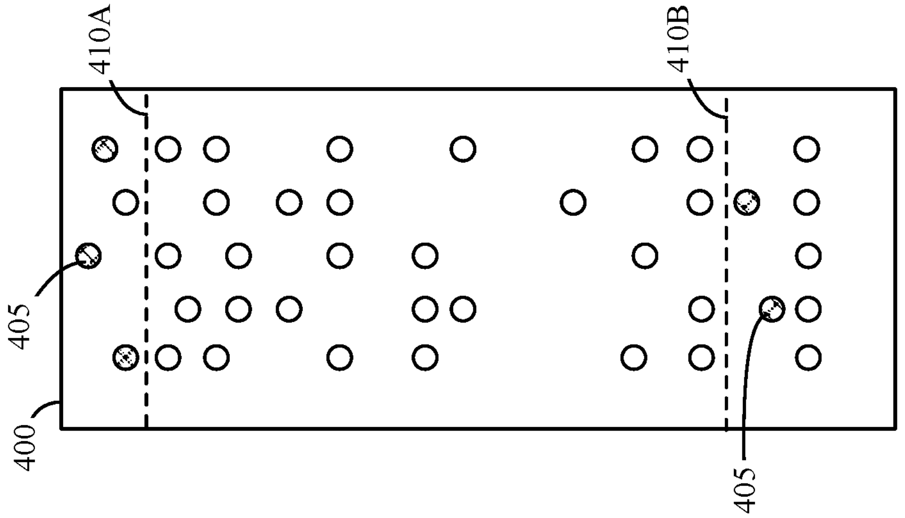
FIG. 4D illustrates the insertion of new bin samples that are associated with random frequencies above a first threshold frequency and/or below a second threshold frequency, in accordance with an example.
Figure 4C:
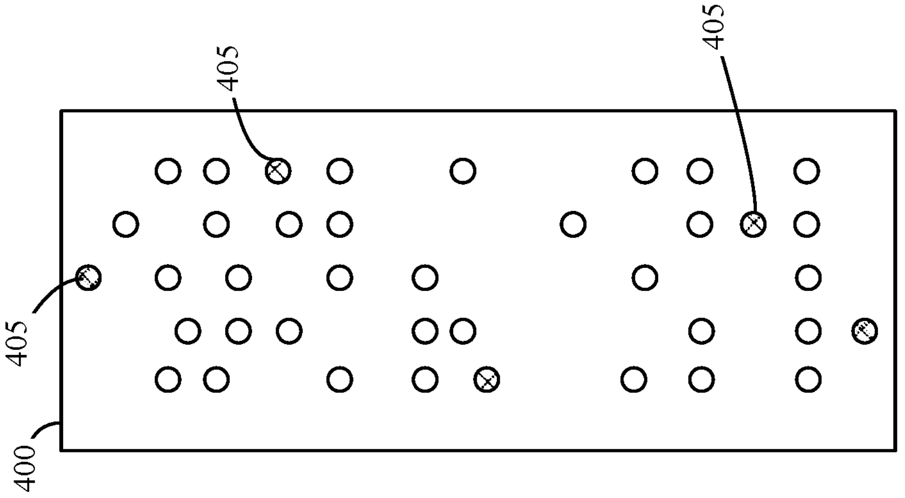
FIG. 4C illustrates the insertion of a new bin sample into the fingerprint portion for each bin sample that was removed, in accordance with an example.

As illustrated in FIG. 4C, an example of the fingerprint extractor 215 is configured to insert a new bin sample 405 into the fingerprint for each bin sample 305 that was removed. For instance, in an example where ten bin samples 305 that are part of a sloped group of bin samples 310 are removed, ten new bin samples 405 are inserted. In an example, the fingerprint extractor 215 is configured to insert the new bin samples 405 into the frames from which bin samples 305 were removed. This leaves each frame with the same number of bin samples 305 it had before removal of bin samples 305 that were part of a sloped group of bins samples 310. As noted further below, some examples of the CRS 102 require each frame of a fingerprint to have a known number (e.g., 20) of bin samples 305 in each frame to facilitate content recognition.

In some examples, the new bin samples 405 are associated with random frequencies so that they appear somewhat randomly arranged in the fingerprint graph. This lessens the likelihood of these bin samples being matched to fingerprints associated with any particular audio content.

As illustrated in FIG. 4D, an example of the fingerprint extractor 215 is configured to insert new bin samples 405 that are associated with random frequencies above a first threshold frequency 410A and/or below a second threshold frequency 410B. For instance, in an example, the new bin samples 405 are associated with random frequencies above a 15 kHz threshold, which is relatively high, or are associated with random frequencies below a 50 Hz threshold, which is relatively low. In some examples, content above the upper threshold and below the lower threshold is less relevant in determining the particular audio content associated with the fingerprint.

Some examples of the fingerprint extractor 215 are configured to normalize the fingerprints either before or after removing bin samples 305 associated with a frequency sweep. As noted above, an example of the fingerprint extractor 215 is configured to select a subset of bin samples 305 within each frame that is associated with the highest energy magnitude levels (e.g., 20 bin samples 305 within each frame having the highest energy magnitude level). However, this might result in some loss of insight into the content represented by the fingerprint because lower energy magnitude audio content may not be represented in the fingerprint. Normalization facilitates scaling (e.g., increasing) the value of bin samples 305 having lower energy magnitude values to make them more likely to be included in the fingerprint. Normalization also facilitates decreasing the value of bin samples 305 having the highest energy magnitude values to deemphasize these bin samples 305 to an extent. From the perspective of the fingerprint graph 300, normalization involves adjusting the values associated with particular bin samples 305 based on the values associated with neighboring bin samples 305 (i.e., those bin samples 305 that are in a predefined region that surrounds the bin sample 305 to be normalized). Examples of the region can correspond to a square region, rectangular region, etc. An example of the predefined region has a width specified in terms of a number of frames and a height specified in terms of a number of bins (e.g., three frames wide by three bins tall). In an example, the mean energy magnitude of the bin samples 305 within the region is determined and used to normalize the value of the bin sample 305 to be normalized. For instance, an example of normalization involves scaling the value of the bin sample 305 to be normalized by the mean energy magnitude value. In an example, normalization is performed for each bin sample 305. That is, each bin sample 305 is normalized according to the mean value of the bin samples 305 in a surrounding region of the bin sample 305.

Figure 5:
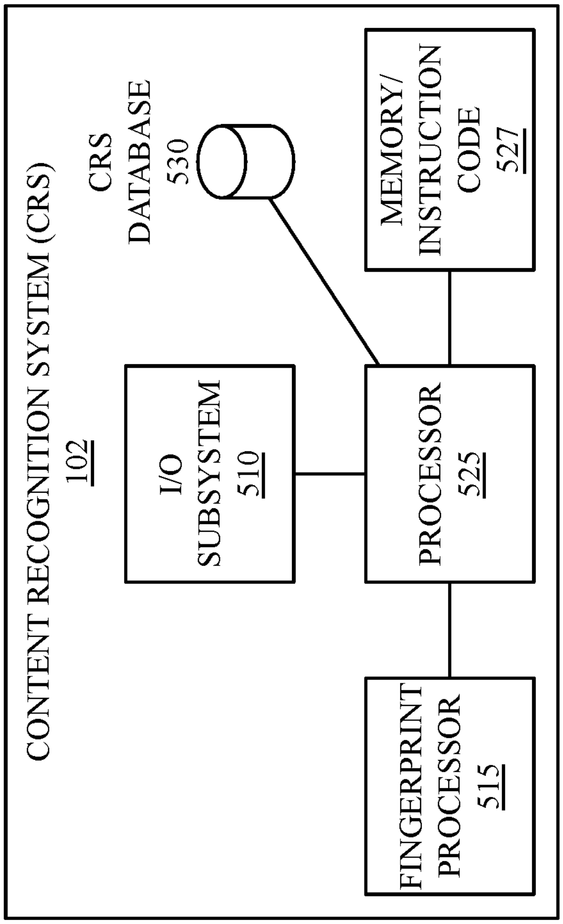
FIG. 5 illustrates a content recognition system (CRS), in accordance with an example.

FIG. 5 illustrates an example of a content recognition system (CRS) 102. An example of the CRS 102 includes a memory 527 and a processor 525. An example of CRS 102 also includes an input/output (I/O) subsystem 510, a fingerprint processor 515, and a CRS database 530.

An example of the processor 525 is in communication with the memory 527. The processor 525 is configured to execute instruction code stored in the memory 527. The instruction code facilitates performing, by the CRS 102, various operations that are described below. In this regard, the instruction code can cause the processor 525 to control and coordinate various activities performed by the different subsystems of the CRS 102. The processor 525 can correspond to a stand-alone computer system such as an Intel®, AMD®, or PowerPC® based computer system or a different computer system and can include application-specific computer systems. The computer system can include an operating system, such as Linux, Unix®, or a different operating system.

An example of the I/O subsystem 510 includes one or more input/output interfaces configured to facilitate communications with entities outside of the CRS 102. An example of the I/O subsystem 510 is configured to communicate information via a RESTful API or a Web Service API. An example of I/O subsystem 510 implements a web browser to facilitate generating one or more web-based interfaces through which users of the CRS 102, the audio source device 104, and/or other systems interact with the CRS 102.

An example of the I/O subsystem 510 includes wireless communication circuitry configured to facilitate communicating information to and from the CRS 102. An example of the wireless communication circuitry includes cellular telephone communication circuitry configured to communicate information over a cellular telephone network such as a 3G, 4G, and/or 5G network. Other examples of the wireless communication circuitry facilitate communication of information via an 802.11 based network, Bluetooth®, Zigbee®, near field communication technology, or a different wireless network.

An example of the fingerprint processor 515 is configured to remove bin samples 305 from fingerprints received from an audio source device 104. While the audio source device 104 is described as being configured to remove bin samples 305 associated with frequency sweeps, it is contemplated that some audio devices may not be similarly equipped. Accordingly, an example of the fingerprint processor 515 is configured to remove bin samples 305 associated with frequency sweeps according to the techniques described above. For instance, an example of the fingerprint processor 515 applies a Hough transform to identify groups of bin samples 305 that, when graphed according to frame number of bin number (or timestamp and frequency), define a substantially straight sloped line (i.e., sloped group of bin samples 310). The lines having a slope between an upper and lower threshold (e.g., between −20° and −5° or between 5° and 20°) are then correlated with the bin samples 305 in the fingerprint. Bin samples 305 that are highly correlated with these lines (e.g., that fall on the lines) are removed. An example of the fingerprint processor 515 normalizes the fingerprints either before or after removing bin samples associated with a frequency sweep.

FIG. 6 illustrates an example of content matching records 600 stored in the CRS database 530. In an example, the content matching records 600 include a content ID field, a content information field, and a fingerprint information field. An example of a content ID field specifies information (e.g., a randomly assigned value, a hash of content data) that uniquely identifies particular content (e.g., a particular song). An example of the content information field specifies a particular song, artist, album, etc. An example of the fingerprint information field specifies one or more fingerprints associated with particular content. Examples of the fingerprints are generated for a plethora of recordings according to the techniques described above.

In operation, the CRS 102 is configured to search the content matching records 600 for a record associated with one or more fingerprints that match the fingerprint received from the audio source device 104. In an example, when a record is found, the content information associated with the record is communicated to the audio source device 104.

Figure 7:
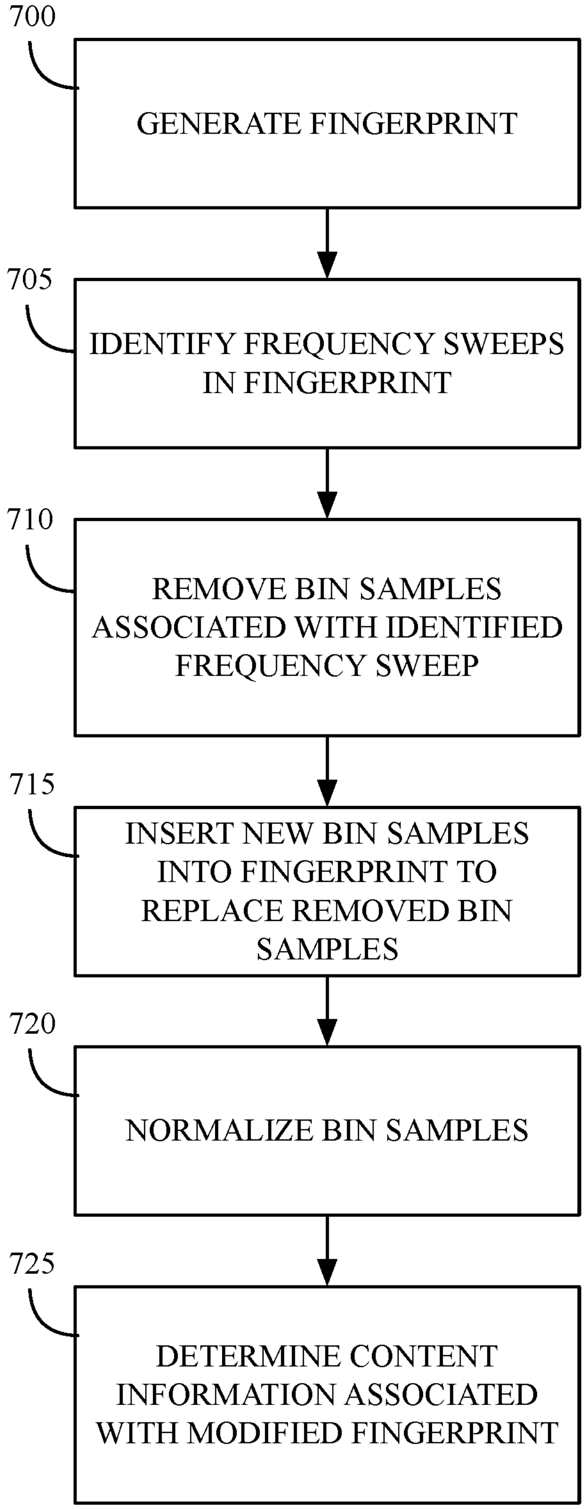
FIG. 7 illustrates operations performed by the audio source device and the CRS, in accordance with an example.

FIG. 7 illustrates examples of operations performed by entities of the environment of FIG. 1, such as the audio source device 104 and the CRS 102. In this regard, one or more of the operations can be implemented via instruction code, stored in respective memories of the audio source device 104 and the CRS 102 configured to cause the processors of the audio source device 104 and the CRS 102 to perform the operations illustrated in the figures and discussed herein.

At block 700, a fingerprint associated with audio content is generated. For instance, in an example, the fingerprint extractor 215 of the audio source device 104 utilizes a Discrete Fourier Transform (DFT) algorithm to transform a time-domain audio signal into a group of bin samples 305. An example of the DFT algorithm outputs a frame of bin values every 64 ms that correspond to energy magnitude levels associated with different frequencies present in the audio signal. For example, in an audio signal having a 20 kHz bandwidth, when linearly distributed, the first bin represents the energy magnitude level associated with frequencies between 0 Hz or DC to about 10 Hz, the second bin represents the energy magnitude level associated with the next 10 Hz, and so on. Thus, in this example, a frame of 2048 bin samples 305 is generated every 64 mS. In an example, the fingerprint extractor 215 is configured to select and aggregate a subset of the bin samples 305 that are the most relevant (e.g., the 20 bin samples 305 associated with the highest energy magnitude levels) during each 64 ms cycle for about 6 seconds and to store the aggregated bin samples 305 as a single fingerprint.

At block 705, frequency sweeps in the fingerprint are identified. For instance, an example of the fingerprint extractor 215 of the audio source device 104 applies a Hough transform to identify groups of bin samples 305 that, when graphed according to frame number and bin number (or timestamp and frequency), define a substantially straight sloped line (i.e., sloped group of bin samples 310). The lines having a slope between an upper and lower threshold (e.g., between −20° and −5° or between 5° and 20°) are selected.

At block 710, bin samples 305 associated with the identified frequency sweeps (i.e., sloped group of bin samples 310) are removed. For example, the lines selected above are correlated with the bin samples 305 in the fingerprint. Bin samples 305 that are highly correlated with these lines (e.g., that fall on the lines) are removed.

At block 715, new bin samples 405 are inserted into the fingerprint to replace the removed bin samples. As described above, an example of the fingerprint extractor 215 of the audio source device 104 is configured to insert a new bin sample 405 into the fingerprint for each bin sample 305 that was removed. For instance, in an example where ten bin samples that are part of a sloped group of bin samples 310 are removed, ten new bin samples 405 are inserted. In an example, the fingerprint extractor 215 is configured to insert the new bin samples 405 into the frames from which the sloped group of bin samples 310 were removed. This leaves each frame with the same number of bin samples 305 it had before removal of the bin samples 305 that were part of a sloped group of bins samples 310. As noted further below, some examples of the CRS 102 require each frame of a fingerprint to have a known number (e.g., 20) bin samples in each frame to facilitate content recognition.

In some examples, the new bin samples 405 are associated with random frequencies so that they appear somewhat randomly arranged in the fingerprint graph. This lessens the likelihood of these bin samples being matched to fingerprints associated with any particular audio content.

As illustrated in FIG. 4D, an example of the fingerprint extractor 215 is configured to insert new bin samples 405 that are associated with random frequencies above a first threshold frequency 405A and/or below a second threshold frequency 405B. For instance, in an example, the new bin samples 405 are associated with random frequencies above a 15 kHz threshold, which is relatively high, or are associated with random frequencies below a 50 Hz threshold, which is relatively low. In some examples, content above the upper threshold and below the lower threshold is less relevant in determining the particular audio content associated with the fingerprint.

At block 720, bin samples of the fingerprint are normalized. For instance, an example of the fingerprint extractor 215 described above normalizes the fingerprints. Normalization facilitates scaling (e.g., increasing) the value of bin samples having lower energy magnitude values to make them more likely to be included in the fingerprint. Normalization also facilitates decreasing the value of bin samples 305 having the highest energy magnitude values to deemphasize these bin samples 305 to an extent. From the perspective of the fingerprint graph 300, normalization involves adjusting the values associated with particular bin samples based on the values associated with neighboring bin samples (i.e., those bin samples that are in a predefined region that surrounds the bin sample to be normalized). Examples of the region can correspond to a square region, rectangular region, etc. An example of the predefined region has a width specified in terms of a number of frames and a height specified in terms of a number of bins (e.g., three frames wide by three bins tall). In an example, the mean energy magnitude of the bin samples within the region is determined and used to normalize the value of the bin sample to be normalized. For instance, an example of normalization involves scaling the value of the bin sample to be normalized by the mean energy magnitude value. In an example, normalization is performed for each bin sample. That is, each bin sample is normalized according to the mean value of the bin samples in a surrounding region of the bin sample.

At block 725, content information associated with the modified fingerprint is determined. In an example, the modified fingerprint is communicated to the CRS 102. The CRS 102 is configured to search content matching records 600 for a record associated with one or more fingerprints that match the modified fingerprint received from the audio source device 104. In an example, when a record is found, the content information 112 associated with the record is communicated to the audio source device 104.

As noted above, in some examples, the audio source device 104 generates the fingerprint, and the CRS 102 identifies the frequency sweeps and modifies the fingerprint accordingly. It is further contemplated the CRS 102 can perform any of the operations described above with respect to the generation of fingerprints associated with particular content. I.e., an example of the CRS 102 generates fingerprints of audio content, removes bin samples associated with frequency sweeps, replaces the removed bin samples with randomly arranged bin samples, normalizes the fingerprints, etc. The CRS 102 then stores the processed fingerprints to a record of the CRS database 530 that is associated with corresponding content information (e.g., name of the song, artist singing the song, album, etc.).

Figure 8:
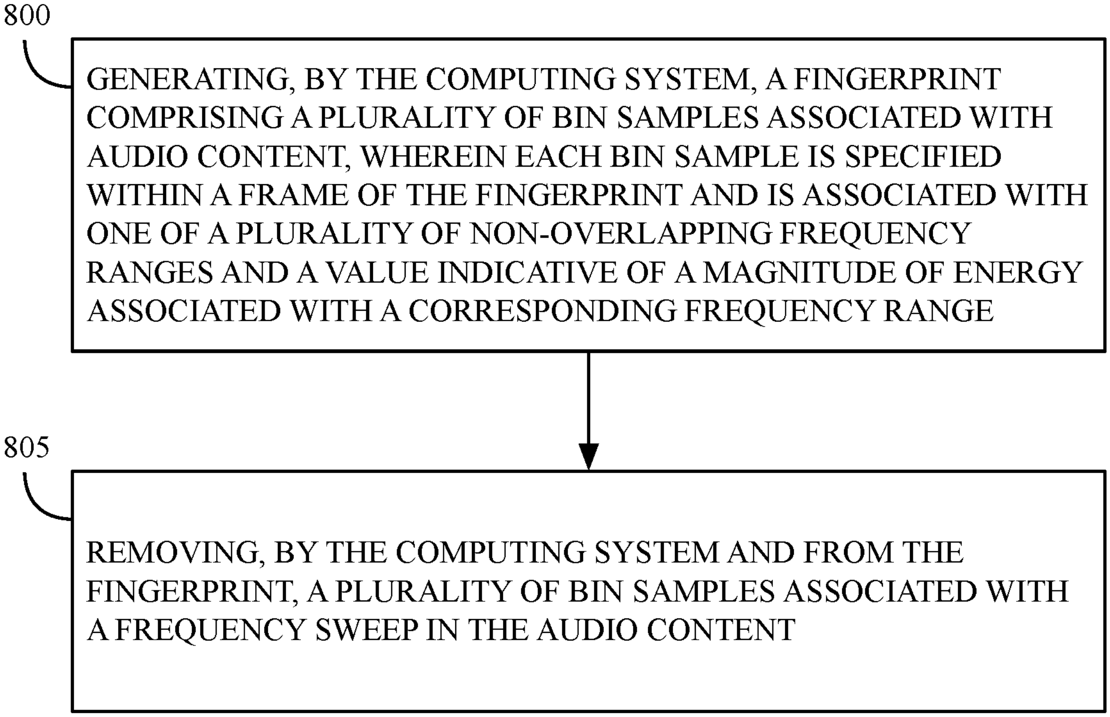
FIG. 8 illustrates a method performed by one or more systems or devices described herein, in accordance with an example.

FIG. 8 illustrates an example of a method that can be performed by one or more systems or devices described herein.

Block 800 involves generating, by the computing system, a fingerprint comprising a plurality of bin samples associated with audio content, wherein each bin sample is specified within a frame of the fingerprint and is associated with one of a plurality of non-overlapping frequency ranges and a value indicative of a magnitude of energy associated with a corresponding frequency range.

Block 805 involves removing, by the computing system and from the fingerprint, a plurality of bin samples associated with a frequency sweep in the audio content.

An example involves inserting a new bin sample 405 into the fingerprint for each removed bin sample.

In an example, inserting the new bin sample 405 into the fingerprint for each removed bin sample involves specifying the new bin sample 405 within the frame associated with the removed bin sample and associating the new bin sample 405 with a frequency region that is different from the frequency range associated with the removed bin sample.

In an example, associating the new bin sample 405 with a frequency region that is different from the frequency range associated with the removed bin sample involves associating the new bin samples 405 with a randomly selected frequency range.

In an example, associating the new bin sample 405 with a randomly selected frequency range involves associating the new bin sample 405 with a randomly selected frequency range that is above a first threshold frequency and below a second threshold frequency.

In an example, removing the plurality of bin samples involves applying a Hough transform to the bin samples to determine a plurality of bin samples that, when plotted according to frame and frequency range, define a substantially straight line.

In an example, removing the plurality of bin samples involves removing bin samples that define a substantially straight line having a slope that is between about −20° and −5° or between about 5° and 20°.

In an example, generating the fingerprint comprising a plurality of bin samples associated with audio content involves processing time-domain samples of the audio content through a Discrete Fourier Transform (DFT) that outputs frequency-domain samples associated with the time-domain samples of the audio content.

An example involves normalizing the value associated with a particular bin sample based on values associated with bin samples in a region that surrounds the particular bin sample.

An example involves, after removal of the plurality of bin samples associated with the frequency sweep in the audio content, searching a fingerprint database for a record that matches the fingerprint, wherein the record specifies content information associated with the fingerprint.

An example involves, after removal of the plurality of bin samples associated with the frequency sweep in the audio content, storing the fingerprint to a fingerprint database record associated with particular content information.

Figure 9:
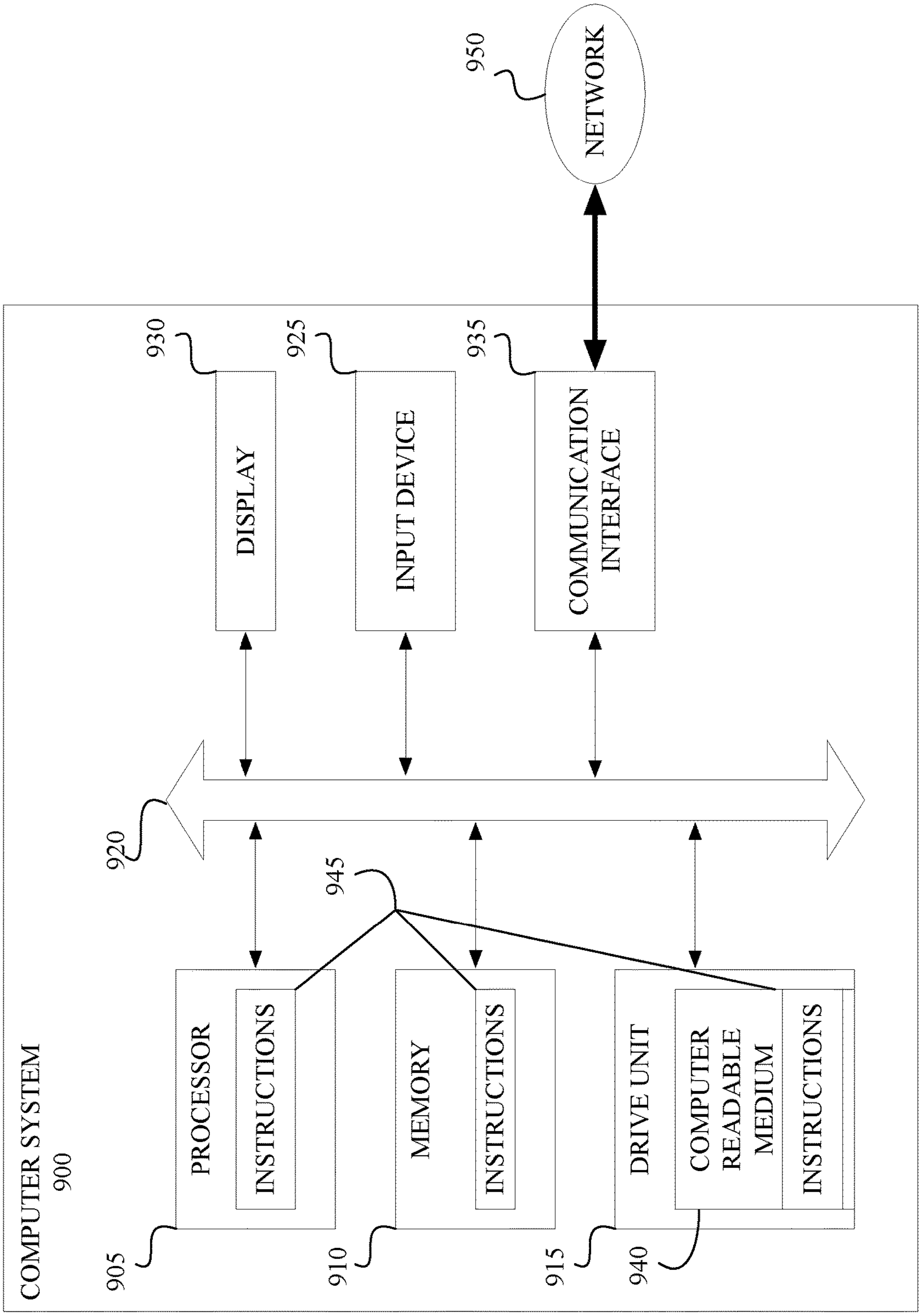
FIG. 9 illustrates a computer system that can form part of or implement any of the systems or devices of the environment, in accordance with an example.

FIG. 9 illustrates an example of a computer system 900 that can form part of or implement any of the systems and/or devices described above. The computer system 900 can include a set of instructions 945 that the processor 905 can execute to cause the computer system 900 to perform any of the operations described above. An example of the computer system 900 can operate as a stand-alone device or can be connected, e.g., using a network, to other computer systems or peripheral devices.

In a networked example, the computer system 900 can operate in the capacity of a server or as a client computer in a server-client network environment, or as a peer computer system in a peer-to-peer (or distributed) environment. The computer system 900 can also be implemented as or incorporated into various devices, such as a personal computer or a mobile device, capable of executing instructions 945 (sequential or otherwise), causing a device to perform one or more actions. Further, each of the systems described can include a collection of subsystems that individually or jointly execute a set, or multiple sets, of instructions to perform one or more computer operations.

The computer system 900 can include one or more memory devices 910 communicatively coupled to a bus 920 for communicating information. In addition, code operable to cause the computer system to perform operations described above can be stored in the memory 910. The memory 910 can be random-access memory, read-only memory, programmable memory, hard disk drive, or any other type of memory or storage device.

The computer system 900 can include a display 930, such as a liquid crystal display (LCD), a cathode ray tube (CRT), or any other display suitable for conveying information. The display 930 can act as an interface for the user to see processing results produced by processor 905.

Additionally, the computer system 900 can include an input device 925, such as a keyboard or mouse or touchscreen, configured to allow a user to interact with components of system 900.

The computer system 900 can also include a disk or optical drive unit 915. The drive unit 915 can include a computer-readable medium 940 in which the instructions 945 can be stored. The instructions 945 can reside completely, or at least partially, within the memory 910 and/or within the processor 905 during execution by the computer system 900. The memory 910 and the processor 905 also can include computer-readable media, as discussed above.

The computer system 900 can include a communication interface 935 to support communications via a network 950. The network 950 can include wired networks, wireless networks, or combinations thereof. The communication interface 935 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed:

1. A method implemented by a computing system, the method comprising:

generating a fingerprint comprising a plurality of bin samples associated with audio content, wherein each bin sample is associated with a frame of the fingerprint and with one of a plurality of non-overlapping frequency ranges and a value indicative of a magnitude of energy associated with a corresponding frequency range; and modifying the fingerprint by (i) removing, by the computing system, from the fingerprint, a plurality of bin samples associated with a frequency sweep in the audio content and (ii) for each removed bin sample, inserting a new bin sample into the fingerprint, wherein inserting the new bin sample into the fingerprint comprises specifying the new bin sample within the frame associated with the removed bin sample and associating the new bin sample with a frequency region that is different from the frequency range associated with the removed bin sample.

2. The method of claim 1, wherein generating the fingerprint comprises processing time-domain samples of the audio content through a Discrete Fourier Transform (DFT).

3. The method of claim 2, wherein the DFT outputs frequency-domain samples associated with the time-domain samples of the audio content.

4. The method of claim 1, wherein removing the plurality of bin samples comprises applying a Hough transform to the bin samples.

5. The method of claim 1, wherein associating the new bin sample with a frequency region that is different from the frequency range associated with the removed bin sample comprises associating the new bin samples with a randomly selected frequency range.

6. The method of claim 5, wherein associating the new bin sample with a randomly selected frequency range comprises associating the new bin sample with a randomly selected frequency range that is above a threshold frequency.

7. The method of claim 5, wherein associating the new bin sample with a randomly selected frequency range comprises associating the new bin sample with a randomly selected frequency range that is below a threshold frequency.

8. The method of claim 1, wherein the method further comprises searching a fingerprint database for a record that matches the modified fingerprint, wherein the record specifies content information associated with the modified fingerprint.

9. The method of claim 8, wherein the method further comprises after removal of the plurality of bin samples associated with the frequency sweep in the audio content, associating the modified fingerprint with a fingerprint database record associated with particular content information.

10. The method of claim 1, wherein the method further comprises normalizing the value associated with a particular bin sample based on values associated with bin samples in a region that surrounds the particular bin sample.

11. A non-transitory computer-readable medium having stored thereon instruction code that, when executed by one or more processors, causes a computing system to perform a set of operations comprising:

generating a fingerprint comprising a plurality of bin samples associated with audio content, wherein each bin sample is associated with a frame of the fingerprint and with one of a plurality of non-overlapping frequency ranges and a value indicative of a magnitude of energy associated with a corresponding frequency range; and modifying the fingerprint by (i) removing, by the computing system, from the fingerprint, a plurality of bin samples associated with a frequency sweep in the audio content and (ii) for each removed bin sample, inserting a new bin sample into the fingerprint, wherein inserting the new bin sample into the fingerprint comprises specifying the new bin sample within the frame associated with the removed bin sample and associating the new bin sample with a frequency region that is different from the frequency range associated with the removed bin sample.

12. The non-transitory computer-readable medium of claim 11, wherein generating the fingerprint comprises processing time-domain samples of the audio content through a Discrete Fourier Transform (DFT).

13. The non-transitory computer-readable medium of claim 12, wherein the DFT outputs frequency-domain samples associated with the time-domain samples of the audio content.

14. The non-transitory computer-readable medium of claim 11, wherein removing the plurality of bin samples comprises applying a Hough transform to the bin samples.

15. The non-transitory computer-readable medium of claim 11, wherein associating the new bin sample with a frequency region that is different from the frequency range associated with the removed bin sample comprises associating the new bin samples with a randomly selected frequency range.

16. The non-transitory computer-readable medium of claim 15, wherein associating the new bin sample with a randomly selected frequency range comprises associating the new bin sample with a randomly selected frequency range that is above a threshold frequency.

17. The non-transitory computer-readable medium of claim 15, wherein associating the new bin sample with a randomly selected frequency range comprises associating the new bin sample with a randomly selected frequency range that is below a threshold frequency.

18. The non-transitory computer-readable medium of claim 15, wherein the set of operations further comprises searching a fingerprint database for a record that matches the modified fingerprint, wherein the record specifies content information associated with the modified fingerprint.

19. The non-transitory computer-readable medium of claim 18, wherein the set of operations further comprises:

after removal of the plurality of bin samples associated with the frequency sweep in the audio content, associating the modified fingerprint with a fingerprint database record associated with particular content information.

20. A computing system comprising:

one or more processors; and a memory in communication with the one or more processors, wherein the memory stores instruction code that, when executed by the one or more processors, causes the computing system to perform a set of operations comprising:

generating a fingerprint comprising a plurality of bin samples associated with audio content, wherein each bin sample is associated with a frame of the fingerprint and with one of a plurality of non-overlapping frequency ranges and a value indicative of a magnitude of energy associated with a corresponding frequency range; and modifying the fingerprint by (i) removing, by the computing system, from the fingerprint, a plurality of bin samples associated with a frequency sweep in the audio content and (ii) for each removed bin sample, inserting a new bin sample into the fingerprint, wherein inserting the new bin sample into the fingerprint comprises specifying the new bin sample within the frame associated with the removed bin sample and associating the new bin sample with a frequency region that is different from the frequency range associated with the removed bin sample.

* * * * *